US012240088B2

(12) United States Patent
Bauer et al.

(10) Patent No.: US 12,240,088 B2
(45) Date of Patent: Mar. 4, 2025

(54) COMPRESSED AIR NAIL GUN WITH A SAFETY DEVICE

(71) Applicant: BeA GmbH, Ahrensburg (DE)

(72) Inventors: Joachim Bauer, Bad Oldesloe (DE); Martin Theberath, Tangstedt (DE)

(73) Assignee: BeA GmbH, Ahrensburg (DE)

( * ) Notice: Subject to any disclaimer, the term of this patent is extended or adjusted under 35 U.S.C. 154(b) by 67 days.

(21) Appl. No.: 17/623,415

(22) PCT Filed: Jul. 2, 2020

(86) PCT No.: PCT/EP2020/068652
§ 371 (c)(1),
(2) Date: Dec. 28, 2021

(87) PCT Pub. No.: WO2021/001477
PCT Pub. Date: Jan. 7, 2021

(65) Prior Publication Data

US 2022/0347825 A1 Nov. 3, 2022

(30) Foreign Application Priority Data

Jul. 2, 2019 (EP) .................................... 19183856

(51) Int. Cl.
*B25C 1/04* (2006.01)
*B25C 1/00* (2006.01)

(52) U.S. Cl.
CPC .............. *B25C 1/008* (2013.01); *B25C 1/043* (2013.01)

(58) Field of Classification Search
CPC ........... B25C 1/008; B25C 1/04; B25C 1/043; B25C 1/047
See application file for complete search history.

(56) References Cited

U.S. PATENT DOCUMENTS 3,490,545 A * 1/1970 Wilfried .................. B25C 1/043 173/15
3,964,659 A * 6/1976 Eiben ...................... B25C 1/043 227/7
4,344,555 A * 8/1982 Wolfberg ................ B25C 1/043 91/309
4,363,250 A 12/1982 Suga
(Continued)

FOREIGN PATENT DOCUMENTS

AU 6859181 A1 10/1981
CN 1558812 A 12/2004
(Continued)

*Primary Examiner* — Thomas M Wittenschlaeger
*Assistant Examiner* — David G Shutty
(74) *Attorney, Agent, or Firm* — The Webb Law Firm

(57) ABSTRACT

The invention relates to a pneumatic nailer having a working piston and a common actuation that is configured to trigger a drive-in process which has a control volume and which is designed to automatically undertake a safety measure when a pressure threshold in the control volume is exceeded or not met. The control volume is ventilated or vented via a throttle such that a delay time, after the expiration of which the pressure threshold is exceeded or not met, is specified by a volume of the control volume and an opening cross-section of the throttle. The control volume has a volume in the range from 0.5 ml to 20 ml and the throttle is a bore having a diameter in the range from 30 μm to 200 μm.

12 Claims, 10 Drawing Sheets

(56) References Cited

U.S. PATENT DOCUMENTS

| | | | | | |
|---|---|---|---|---|---|
| 5,522,532 | A * | 6/1996 | Chen | B25C 1/008 227/8 |
| 6,604,664 | B2 * | 8/2003 | Robinson | B25C 1/043 227/8 |
| 6,902,092 | B2 | 6/2005 | Osuga et al. | |
| 7,556,183 | B1 * | 7/2009 | Liang | B25C 1/008 227/129 |
| 7,762,442 | B2 * | 7/2010 | Liang | B25C 1/043 227/8 |
| 9,782,879 | B2 * | 10/2017 | Bauer | B25C 1/04 |
| 10,335,936 | B2 * | 7/2019 | Lai | B25C 1/041 |
| 10,569,402 | B2 * | 2/2020 | Lijima | B25C 1/008 |
| 10,596,690 | B2 * | 3/2020 | Weigmann | B25C 1/047 |
| 10,688,641 | B2 * | 6/2020 | Weigmann | B25C 1/06 |
| 10,843,317 | B2 | 11/2020 | Sato et al. | |
| 11,065,747 | B2 * | 7/2021 | Hähndel | B25C 1/047 |
| 11,090,790 | B2 | 8/2021 | Theberath et al. | |
| 11,135,712 | B2 * | 10/2021 | Fukushima | B25C 1/046 |
| 11,185,967 | B2 * | 11/2021 | Oouchi | B25C 1/043 |
| 11,541,522 | B2 | 1/2023 | Theberath et al. | |
| 11,628,549 | B2 | 4/2023 | Theberath et al. | |
| 2002/0125290 | A1 | 9/2002 | Robinson | |
| 2005/0023318 | A1 * | 2/2005 | Aguirre | B25C 1/008 227/8 |
| 2005/0156008 | A1 * | 7/2005 | Komazaki | B25C 1/043 227/10 |
| 2007/0251972 | A1 * | 11/2007 | Lee | B25C 1/043 227/130 |
| 2011/0226095 | A1 | 9/2011 | Chen | |
| 2018/0036870 | A1 | 2/2018 | Komazaki et al. | |
| 2018/0272514 | A1 | 9/2018 | Pergantis et al. | |
| 2019/0099871 | A1 | 4/2019 | Fukushima et al. | |
| 2019/0176312 | A1 | 6/2019 | Theberath et al. | |

FOREIGN PATENT DOCUMENTS

| | | | | |
|---|---|---|---|---|
| CN | 103770078 A | | 5/2014 | |
| CN | 106799705 A | | 6/2017 | |
| CN | 107708934 B | | 1/2022 | |
| DE | 2247072 | | 4/1974 | |
| DE | 102013106657 A1 | | 1/2015 | |
| EP | 2767365 B1 | | 12/2016 | |
| EP | 3461592 A1 | | 4/2019 | |
| EP | 3479963 A1 | | 5/2019 | |
| EP | 3446833 B1 | | 4/2020 | |
| JP | 2019063928 A | | 4/2019 | |
| SU | 495200 A1 | | 12/1975 | |
| SU | 893514 A1 | | 12/1981 | |
| TW | 201132460 A1 | | 10/2011 | |
| WO | 2007126735 A2 | | 11/2007 | |
| WO | 2016136632 A1 | | 9/2016 | |
| WO | 2017201790 A1 | | 11/2017 | |
| WO | WO-2017215977 A1 | * | 12/2017 | B25C 1/00 |
| WO | 2019038124 A1 | | 2/2019 | |

* cited by examiner

COMPRESSED AIR NAIL GUN WITH A SAFETY DEVICE

CROSS-REFERENCE TO RELATED APPLICATIONS

This application is the United States national phase of International Application No. PCT/EP2020/068652 filed Jul. 2, 2020, and claims priority to European Patent Application No. 19183856.4 filed Jul. 2, 2019, the disclosures of which are hereby incorporated by reference in their entirety.

BACKGROUND OF THE INVENTION

Field of the Invention

The invention relates to a compressed air nail gun which has a trigger, a contact sensor and a safety device. If the compressed air nail gun is placed on a workpiece, the contact sensor will move against the force of a spring until an outlet tool lies on, or nearly on, the workpiece. Only when the contact sensor is actuated in this manner can a drive-in process be triggered. As a result, the compressed air nail guns offer significantly improved safety against accidental triggering compared to devices without contact sensors.

Description of Related Art

Some compressed air nail guns of the type described can be used in two different modes of operation: In the case of so-called single triggering, the compressed air nail gun is first placed on a workpiece and the contact sensor is actuated as a result. Then, the trigger is actuated manually and a single drive-in process is triggered as a result. In the case of so-called contact triggering, also called "touching", the user already holds down the trigger while they place the compressed air nail gun on the workpiece. When placed on the workpiece, the contact sensor is actuated and a drive-in process is triggered as a result. The compressed air nail gun can be repeatedly placed in quick succession which makes it possible to work very quickly, in particular if many fastening means have to be driven in for adequate fastening and only low requirements are set for their position accuracy.

In certain situations however, there is an increased risk of injury with the contact triggering method. If the user does not only hold down the manually-actuated trigger for example when they wish to place the compressed air nail gun on one and the same workpiece at a distance of a few centimeters from the most recently driven-in fastening means, but rather also when they change to another workpiece, arranged further away, a drive-in process may be triggered by unintended contact of an object or a body part with the contact sensor. For example, accidents may occur if a user (when not observing important safety requirements) climbs a ladder with the compressed air nail gun, with the trigger held down in the process, and accidentally brushes their leg with the contact sensor.

Some known compressed air nail guns seek to reduce this risk associated with the contact triggering operation by contact triggering being possible only for a brief time period after actuating the trigger or after a drive-in process. If this time period lapses, the trigger must first be released again. An example of this is known from the publication EP 2 767 365 B1. The compressed air nail gun described therein has a trigger and a contact sensor to each of which a control valve is assigned. Additionally, the known device has a safety control chamber, whose pressure acts on a locking piston. In a certain position of the locking piston, the triggering of a drive-in process is prevented. The safety control chamber is aerated via the control valve, assigned to the trigger, and a throttle. As a result, after actuating the trigger, contact triggering is possible only until the pressure in the safety control chamber has exceeded a specified pressure threshold. After this, the compressed air nail gun is locked until the trigger is released and the pressure in the safety control chamber has once again decreased below the pressure threshold.

A similar functionality is offered by the compressed air nail gun known from U.S. Pat. No. 3,964,659 which can also be used in a single triggering operation and in a contact triggering operation and in which a trigger and a contact sensor are mechanically coupled via a rocker. The rocker acts on a control valve in order to trigger a drive-in process by deaerating a main control line. If only the trigger and not the contact sensor is actuated, a control pin of the control valve is moved only over a part of its adjustment path. This half actuation of the control valve leads to a slow aeration of a control chamber via a small adjustable aeration opening. The pressure prevailing in the control chamber acts on a valve sleeve which surrounds the control valve and moves this valve sleeve ultimately into a locked position in which a full actuation of the valve pin can no longer deaerate the main control line such that contact triggering is not possible.

A further improvement in safety can be achieved if a first drive-in process must always be carried out by individual triggering. In this case, the device must first be placed on the workpiece for the first drive-in process, whereby the contact sensor is actuated. A subsequent actuation of the trigger then triggers the first drive-in process. After that, further drive-in processes can take place within a short time period by contact triggering, i.e. by repeatedly lifting and placing down the device on the workpiece with continuously actuated trigger. This functionality is present in the case of the compressed air nail gun described in the publication DE 10 2013 106 657 A1. To this end, a trigger and a contact sensor are mechanically coupled via a rocker which acts on a control valve in order to trigger a drive-in process. With each drive-in process, a pressure is built up in a relatively large-volume control chamber, which surrounds a working cylinder in a ring shape, said pressure acting on a mechanical actuating member. The control chamber is slowly deaerated via a deaeration opening in a wall of the working cylinder. The actuating member reaches a locked position depending on the pressure in the control chamber, whereby a mechanical action of the contact sensor on the rocker is prevented when the trigger is actuated and contact triggering is made impossible.

From document WO 2019/038124 A1, a compressed air nail gun is known in which the described functionality is achieved by pneumatic means. For this purpose, a control chamber is aerated via the control valve when a control valve is actuated. A delay time, after which the compressed air nail gun returns from the contact triggering operation to the individual triggering operation, results from slow deaeration of the control chamber by a throttle. In one exemplary embodiment, the control chamber merges into a first, smaller storage chamber, which is connected to a second, larger storage chamber via a first throttle. When a drive-in process is triggered, the smaller storage chamber is aerated via a control valve. In addition, the larger storage chamber is aerated from a return chamber. The slow deaeration takes place via a second throttle, which connects the second storage chamber to external air. In this way, a larger quantity of air can be used to adjust the delay time than could be provided by the control valve alone in the time available. This should enable the use of an easy-to-produce, less failure-prone throttle with a relatively large opening cross-section, in particular in the form of a small borehole with a diameter in the range of 0.1 mm to 1 mm.

SUMMARY OF THE INVENTION

Based on this, the object of the invention is to provide a compressed air nail gun with a compact design and a simple, robust and reliable safety mechanism.

This object is achieved by the compressed air nail gun with the features as described herein. Advantageous embodiments are indicated in the dependent claims.

The compressed air nail gun has

- a working piston which is connected to a driving ram for driving in a fastening means and to which compressed air is applied when a drive-in process is triggered,
- a trigger and a contact sensor, the common actuation of which can trigger a drive-in process,
- a safety device which has a control volume and is designed to automatically take a safety measure when a pressure threshold is exceeded or undercut in the control volume, with the control volume being aerated or deaerated via a throttle in such a way that a delay time, after the expiry of which the pressure threshold is exceeded or undercut, is specified by a volume of the control volume and an opening cross-section of the throttle, with
- the control volume having a volume in the range of 0.5 ml to 20 ml and the throttle being a borehole with a diameter in the range of 30 μm to 200 μm.

The compressed air nail gun is used for driving in fastening means, such as nails, pins or staples. To this end, the compressed air nail gun can have a magazine for the fastening means from each of which one fastening means is supplied to a receiver of an outlet tool of the compressed air nail gun. When a drive-in process is triggered, compressed air is applied to the working piston of the compressed air nail gun. The working piston drives a driving ram which is connected to the working piston. The driving ram impinges upon a rear end of the fastening means in the receiver of the outlet tool and drives the fastening means into the workpiece.

The contact sensor can be a mechanical structural element which protrudes over the front end of the outlet tool and is held in this position by a spring until the compressed air nail gun is placed on a workpiece. Then, the contact sensor is moved counter to the direction of the spring force and counter to the drive-in direction until an outlet tool of the compressed air nail gun lies on, or nearly on, the workpiece. As a further actuation element, the compressed air nail gun has a trigger, for example in the form of a trigger lever that can be actuated with a finger.

The safety device is responsible for preventing a drive-in process being triggered in certain, potentially dangerous situations. For this purpose, it automatically takes a safety measure which ensures that no drive-in process is triggered despite a common actuation of the contact sensor and trigger. For example, the safety measure can be to disconnect the compressed air nail gun from a pressure supply line and deaerate it completely. However, less intrusive safety measures are also possible, in particular those in which the compressed air nail gun is brought back into a ready-to-operate state by simply briefly releasing the trigger. Details on this will be explained later.

As in the case of the prior art discussed at the beginning, in particular in document WO2019/038124 A1, the safety device automatically takes the safety measure after expiry of a delay time. The delay time starts to run from a certain event, for example from an actuation of the trigger or a previous drive-in process. At this point in time, the pressure in the control volume may have a certain initial value, for example, operating pressure or ambient pressure. From this point on, the control volume is aerated or deaerated via the throttle until the pressure in the control volume exceeds or undercuts a specified pressure threshold. The delay time ends at this point. The duration of the delay time is therefore determined by the volume of the control chamber and the opening cross-section of the throttle.

In the invention, the control volume has a volume in the range from 0.5 ml to 20 ml, in particular in the range from 0.5 ml to 10 ml, in the range from 0.5 ml to 5 ml, in the range from 0.5 ml to 2 ml or in the range from 1 ml to 1.5 ml. The throttle is a borehole with a diameter in the range from 30 μm to 200 μm, in particular in the range from 30 μm to 95 μm, in the range from 40 μm to 80 μm or in the range from 60 μm to 80 μm. The borehole can in particular have a substantially circular cross-section. Thus, a relatively small volume is combined with a small opening cross-section in order to achieve a reasonable delay time. Unlike what is known in the prior art in connection with small control volumes, a simple, small borehole is used instead of a throttle whose opening cross-section is formed by an adjustable annular gap. These measures result in a particularly compact, structurally simple design.

In addition, the inventors have recognised that an annular gap with a sufficiently small opening cross-section has a very small gap width, which can for example be in the range of a few μm or even less, and that such an annular gap easily clogs over time during operation of the compressed air nail gun. This is detrimental to the safety of the device, as the delay time may be extended unnoticed under certain circumstances until the safety device may no longer even respond. It is assumed that the clogging of the annular gap is caused by the smallest particles, whose penetration into the compressed air nail gun can hardly be prevented, simply because such particles, such as in particular fine dust, can already be contained at a certain concentration in the compressed air used to operate the devices. Although the borehole used in the invention has an opening cross-section comparable to the annular gap, the diameter of the borehole is significantly larger than the width of the annular gap. The inventors have determined that the safety device is significantly less sensitive to soiling when using a borehole instead of a throttle with an annular gap and attribute this to the different dimensions of the respective openings mentioned.

Overall, the invention thus provides a structurally simple, compact and particularly reliable safety device.

In one configuration, the borehole is produced by laser drilling. In principle, the borehole can be produced using any method, in particular a machining method with a conventional drill or milling cutter.

However, producing very small boreholes with machining processes is difficult and requires expensive and sensitive special tools that wear quickly. Laser drilling is an alternative in which the material, in which the borehole is made, is not machined, but evaporated and/or liquefied by means of a laser. Unlike machining processes, it is not possible to drill exactly cylindrical boreholes with laser drilling under certain circumstances. However, this is not important for the invention. More important is the reproducibility of the borehole dimensions, which can easily be achieved with the required quality using laser drilling. A particular advantage of laser drilling in comparison with the machining methods is the largely burr-free contour of the borehole edges, which can be important in the invention with a view to a possible "sticking" of dirt particles.

In one configuration, the borehole has a length in the range of 30 μm to 1 mm. This means that the component in which the borehole is inserted has a corresponding thickness directly adjacent to the borehole. For this purpose, the material thickness of the component in the area of the borehole can be reduced accordingly before the borehole is produced. The length of the borehole, as well as its diameter, influences the compressed air flow through the borehole. For the low compressed air flow desired at a low control volume in order to achieve a reasonable delay time, a relatively long borehole may therefore be sensible. Tests have shown that the length of the borehole in the mentioned range is in many cases suitable in practice. It may be difficult to produce a particularly long borehole under certain circumstances. Therefore, a length in the range of 30 μm to 200 μm, in particular in the range of 40 μm to 100 μm, is particularly suitable. The borehole can have the same diameter over its entire length, i.e. be exactly cylindrical. However, this is not necessary for the invention; production-related deviations such as for example a certain conicity of the borehole, which can occur during laser drilling, are generally unproblematic. If the borehole deviates from an exactly cylindrical shape, an average diameter over the length of the borehole or a minimum diameter of the borehole can be used as the diameter of the borehole.

In one configuration, the compressed air nail gun has a first control valve, which is actuated with each actuation of the trigger, with the control volume being aerated or deaerated via the first control valve. The first control valve is assigned to the trigger and is therefore sometimes referred to as the triggering valve. For example, the first control valve can have a valve pin, which is moved directly from an actuating surface of the trigger lever when the trigger is actuated. As a result of this actuation, the first control valve establishes a connection via which the control volume is aerated or deaerated, for example a connection between the control volume and a space permanently under operating pressure or between the control volume and external air. In this configuration, the explained delay time can begin with the actuation of the trigger.

In one configuration, the compressed air nail gun has a second control valve, which is actuated with each actuation of the contact sensor or with each common actuation of trigger and contact sensor, with a main control line being aerated and/or deaerated via the second control valve. The second control valve is assigned to the contact sensor and is therefore sometimes also referred to as the contact sensor valve. Whether it is actuated each time the contact sensor is actuated or only when the trigger is actuated at the same time depends on the design of the compressed air nail gun. Both variants are explained in connection with the exemplary embodiments. In any case, the effect of the actuation of the second control valve is that a main control line is aerated and/or deaerated. To this end, the second control valve can in particular establish a connection between the main control line and a space permanently under operating pressure or between the main control line and external air. A drive-in process can be initiated by aerating or deaerating the main control line. For this purpose, for example, a design is known having a main valve and a pilot valve, which is actuated via the main control line. However, other designs with or without pilot valve are also conceivable. For the configuration of the invention, it is only important that the drive-in process can be triggered by aerating or deaerating the main control line.

In one configuration, the control volume includes an annular volume, which surrounds a control valve. In principle, the control volume can have any geometry. However, with many designs of compressed air nail guns, the available installation space is limited, so that even the relatively small control volume in case of the invention cannot easily be accommodated. The use of an annular volume around a control valve takes this situation into account. The control valve can in particular be the explained first control valve or the explained second control valve.

In one configuration, the compressed air nail gun comprises a housing which has a recess in which a control valve arrangement is arranged, with the control volume being arranged in full or in large part in the recess. The housing can for example enclose the working cylinder of the compressed air nail gun and/or have a handle section. The recess can for example be arranged inside the handle section. The control valve arrangement can in particular comprise the explained first control valve and/or the explained second control valve. The control valve arrangement can be sealed with respect to the surrounding housing. The control volume can be located between the control valve arrangement and the housing. In this configuration, a particularly compact and structurally simple design is obtained.

In one configuration, the borehole is arranged in a replaceable component of the compressed air nail gun. The replaceable component is in particular a component different from the housing of the compressed air nail gun, for example an element of a control valve arrangement or a compressed air line. On the one hand, this configuration enables simplified maintenance or repair of the borehole, for example in order to be able to thoroughly remove dirt or corrosion. On the other hand, by simply replacing the replaceable component, the delay time can be adapted to the respective requirements by using replaceable components with different borehole diameters and/or lengths.

For the latter purpose, in a further configuration, it is conceived that at least one second copy of the replaceable component is present, which differs from the replaceable component in diameter and/or length of the borehole. In particular, the compressed air nail gun with the replaceable component and the at least one, second copy of the replaceable component can be offered in a set.

In one configuration, the replaceable component is a valve sleeve. In particular, this can be a valve sleeve of the first control valve, whereby a particularly simple and compact design is achieved for aerating or deaerating the control volume through the borehole and controlled by the first control valve.

In one configuration, the safety measure is that the compressed air nail gun is moved to a locked state in which no drive-in process can be triggered. For example, the compressed air nail gun can have a locking piston, which mechanically intervenes in an operation required to trigger a drive-in process, for example by preventing an actuating member of a pilot valve from moving. Alternatively, the locked state can be established by shutting off the compressed air nail gun from a compressed air supply by means of a shut-off valve and/or completely deaerating it. It is also possible to establish the locked state by opening or shutting off a control line, which must be aerated or deaerated in order to trigger a drive-in process, by means of a shut-off valve. This control line can in particular be the main control line already mentioned.

In one configuration, the compressed air nail gun can be operated in a contact triggering operation and in a single triggering operation, and the safety measure is that the compressed air nail gun is moved from the contact triggering operation to the single triggering operation. As explained in the introduction, this measure can also improve the operational safety of the compressed air nail gun. After the compressed air nail gun has been set to the single triggering operation, contact triggering is not possible. Instead, single triggering must first be carried out, which is generally only possible again once the trigger has been released beforehand.

In one configuration, the compressed air nail gun has a locking sleeve which is movable between a locked position and an open position, with the locking sleeve shutting off a connection between a main control line and a control valve in the locked position and opening it in the open position. In this configuration, the safety measure can essentially consist of the locking sleeve being moved into the locked position. The locking sleeve can be integrated into a control valve arrangement, which comprises the explained first control valve and/or the explained second control valve. In particular, the locking sleeve can receive the explained second control valve inside it.

In one configuration, the pressure in the control volume is applied to the locking sleeve. In this way, the position of the locking sleeve is directly influenced by the pressure prevailing in the control volume. The force exerted by this pressure can in particular be combined with another pneumatically generated counterforce and/or the force of a spring.

BRIEF DESCRIPTION OF THE DRAWINGS

The invention will be explained in more detail below with reference to two exemplary embodiments represented in the figures. In the drawings is shown.

DESCRIPTION OF THE INVENTION

Figure 1:
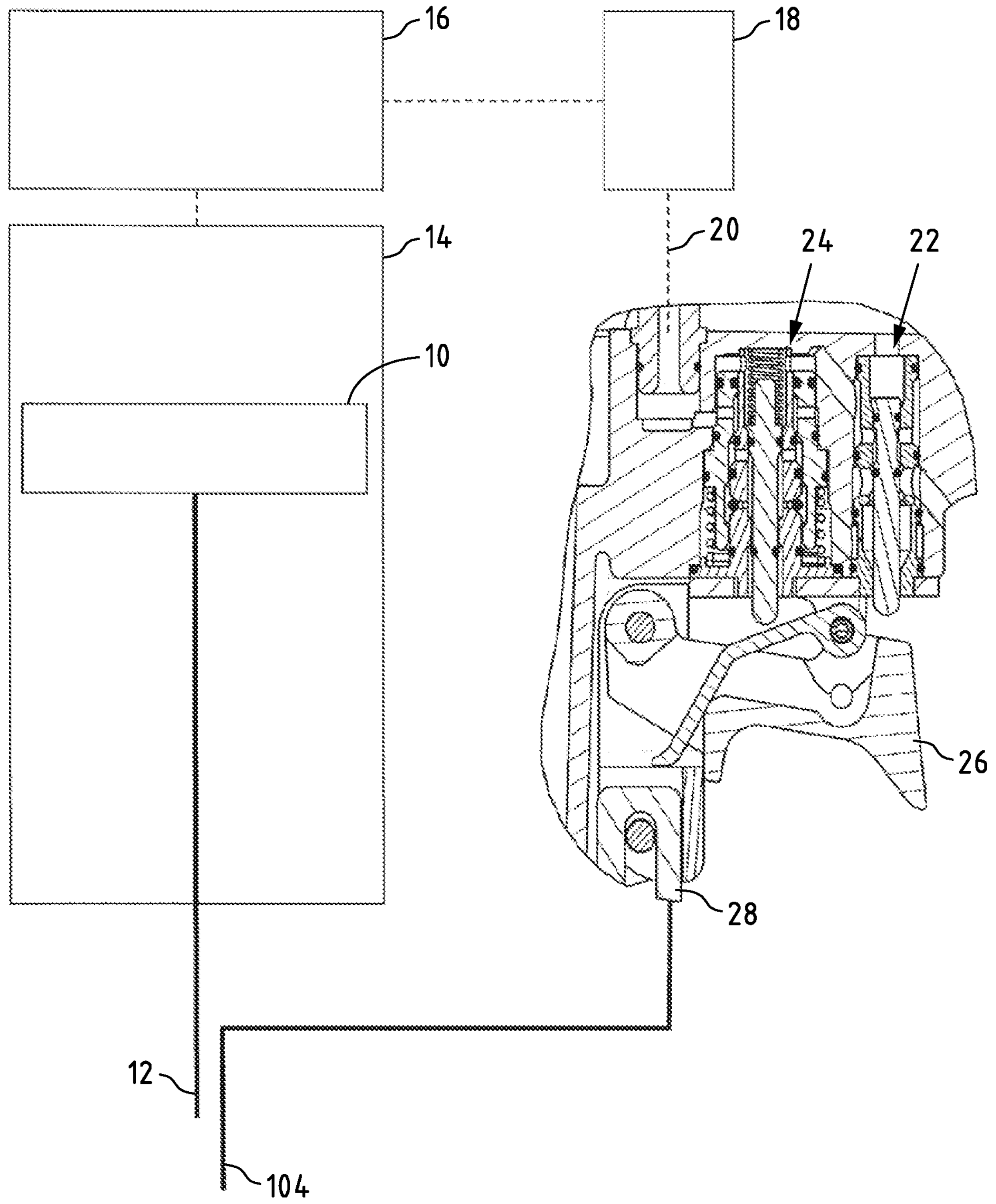
FIG. 1 compressed air nail gun with a control valve arrangement shown in cross-section and further elements represented only schematically, FIG. 2 the control valve arrangement from FIG. 1 in an enlarged representation, FIG. 3 the control valve arrangement from FIG. 1 after actuation of the contact sensor, FIG. 4 the control valve arrangement from FIG. 1 after actuation of the trigger, FIG. 5 the control valve arrangement from FIG. 1 after removing the compressed air nail gun from a workpiece, FIG. 6 the control valve arrangement from FIG. 1 after expiry of a delay time, FIG. 7 a control valve arrangement of a further compressed air nail gun in cross-section, FIG. 8 the control valve arrangement from FIG. 7 after actuation of the trigger, FIG. 9 the control valve arrangement from FIG. 7 after actuation of the contact sensor and FIG. 10 the control valve arrangement from FIG. 7 after removing the compressed air nail gun from a workpiece.

The compressed air nail gun from FIG. 1 comprises a working piston 10, which is connected to a driving ram 12. The working piston 10 is displaceably mounted in a working cylinder 14. If compressed air is applied above the working piston 10, a fastening means, not represented, can be driven into a workpiece with the driving ram 12. A main valve 16 is located above the working cylinder 14, which is responsible for supplying the working cylinder 14 with compressed air from a compressed air reservoir, not represented, inside the compressed air nail gun or by a compressed air connection. The main valve 16 is actuated by a pilot valve 18. In turn, the pilot valve 18 is actuated by a main control line 20. As soon as the main control line 20 is aerated, the pilot valve 18, and subsequently the main valve 16, switches and a drive-in process is triggered.

All the elements of FIG. 1 mentioned thus far are only represented schematically. A specific configuration of these elements can, for example, be inferred from FIGS. 1 and 2 of document WO 2019/038124 A1 as well as the corresponding description therein. The design described in the document is suitable for use with the invention.

The elements represented in FIG. 1 in the cross-section, which are collectively referred to as control valve arrangement, are important for the understanding of the invention. They are responsible for controlling the pressure in the main control line 20 and thus for triggering drive-in processes. These elements include a first control valve 22, a second control valve 24, a trigger 26 and a contact sensor 28. In the cross-sectional representation of FIG. 1, only one upper end of the contact sensor 28 is shown. The contact sensor 24 also comprises a lower end 104, which in FIG. 1 is represented schematically and protrudes over an opening of an outlet tool not represented. Details on the control valve arrangement will be explained further with reference to the enlarged representation of FIG. 2.

Figure 2:
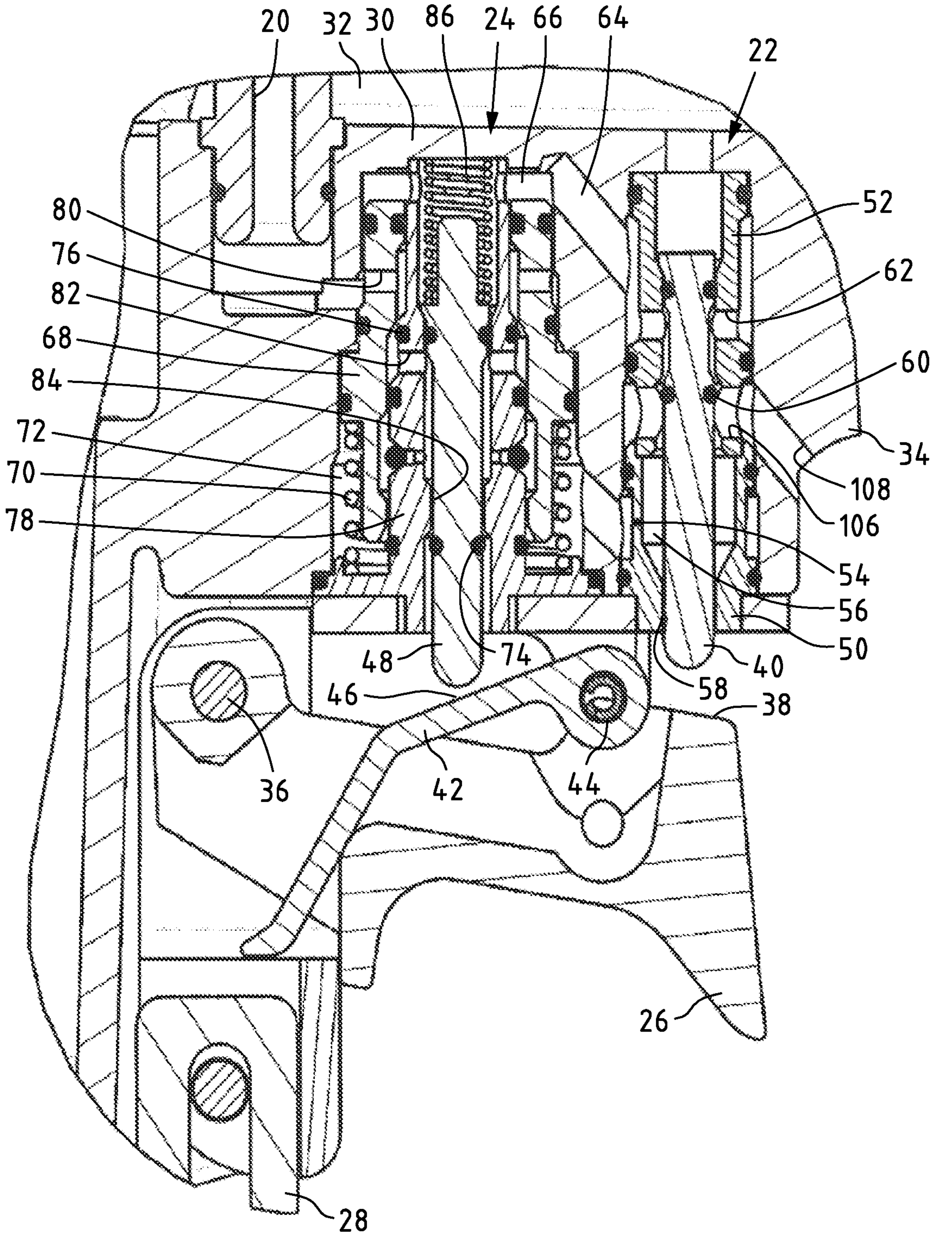

FIG. 2 shows the control valve arrangement in an initial state of the compressed air nail gun, in which trigger 26 and contact sensor 28 are not actuated and the compressed air nail gun is correctly connected to a compressed air source. The housing interior 32 (which is also only partially represented) arranged inside the housing 30, which can only be recognised in sections, is then continuously under operating pressure. The housing 30 merges, on the right edge of FIG. 2, into a handle section 34 of the compressed air nail gun.

The trigger 26 is pivotably mounted on the housing 30 about an axis 36 fixed to the housing. At its rear end, it has an actuating surface 38 by means of which a valve pin 40 of the first control valve 22 is movable. The rear end of the contact sensor 28 interacts with a contact sensor lever 42 arranged partially inside a recess of the trigger 26. At the rear end, the contact sensor lever 42 is pivotably mounted on the housing 30 about an axis 44 fixed to the housing. The front end of the contact sensor lever 42 is entrained by the rear end of the contact sensor 28 when the contact sensor 28 moves upwards relative to the housing 30 when the compressed air nail gun is placed on a workpiece. As a result, an actuating surface 46 of the contact sensor lever 42 moves a valve pin 48 of the second control valve 24 upwards.

The first control valve 22 comprises a lower valve sleeve 50 and an upper valve sleeve 52. A small borehole 54 is arranged in the transverse direction in the lower valve sleeve 50. This borehole 54 has a diameter of about 70 μm and a length of about 200 μm. Due to these very small dimensions, the borehole 54 in FIG. 2 is not to scale, but represented in a slightly enlarged manner. The space 56 arranged inside the lower valve sleeve 50, which adjoins the borehole 54, is permanently connected to external air via a transverse borehole 106 in the upper valve sleeve 52 and an obliquely arranged borehole 108 in the housing 34. A further, continuous connection between the space 56 and external air exists via an annular gap 58 between the valve pin 40 and the lower valve sleeve 50.

In the position of the first control valve 22 shown, the lower O-ring 60 is not sealed on the valve pin 40, so that the obliquely arranged borehole 64 and a space 66 connected to it above a locking sleeve 68, which surrounds the second control valve 24, are also deaerated via the transverse borehole 62 in the upper valve sleeve 52.

The locking sleeve 68 is in the indicated initial state in an upper end position in which it is held by the force of a spring 70. This upper end position is an open position. A further force on the locking sleeve 68 is exerted by the pressure in a control volume 72, which surrounds the second control valve 24 in a ring shape. In the indicated initial state, this force is zero because the control volume 72 has not yet been supplied with compressed air and is connected to external air via the borehole 54. In the example represented, the control volume 72 has a volume in the range between 1 ml and 1.5 ml.

As long as the valve pin 48 of the second control valve 24 is in its unactuated position, the lower O-ring 74 is not sealed on the valve pin 48. The upper O-ring 76 is also not sealed on the valve sleeve 78 of the second control valve 24. Therefore, the main control line 20 is connected to external air via a transverse borehole 80 in the locking sleeve 68, running past the upper O-ring 76, via a transverse borehole 82, an annular gap 84 between valve pin 48 and valve sleeve 78 and running past the O-ring 74.

Figure 3:
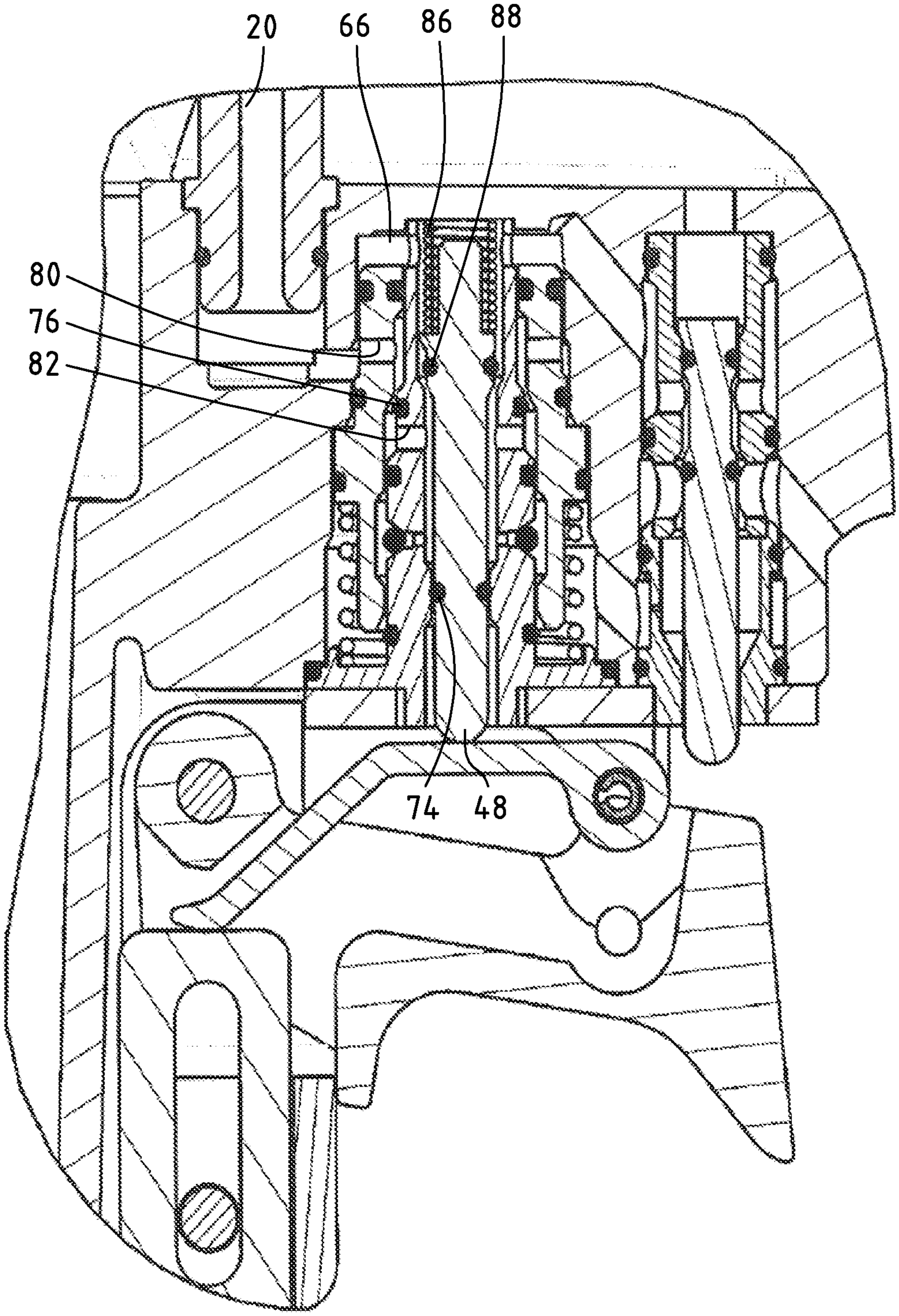

If, starting from the state shown in FIG. 2, the contact sensor 28 is actuated, the valve pin 48 of the second control valve 24 moves against the force of a spring 86 into its actuated position shown in FIG. 3, in which the O-ring 74 is sealed. As a result, the main control line 20 is shut off from external air. In addition, by moving the valve pin 48, its upper O-ring 88 releases the seal, whereby a connection is established between the space 66 and the main control line 20, namely running past the O-ring 88, through the transverse borehole 82, running past the O-ring 76 and through the transverse borehole 80. As the space 66 is still depressurised, no drive-in process is triggered yet.

Figure 4:
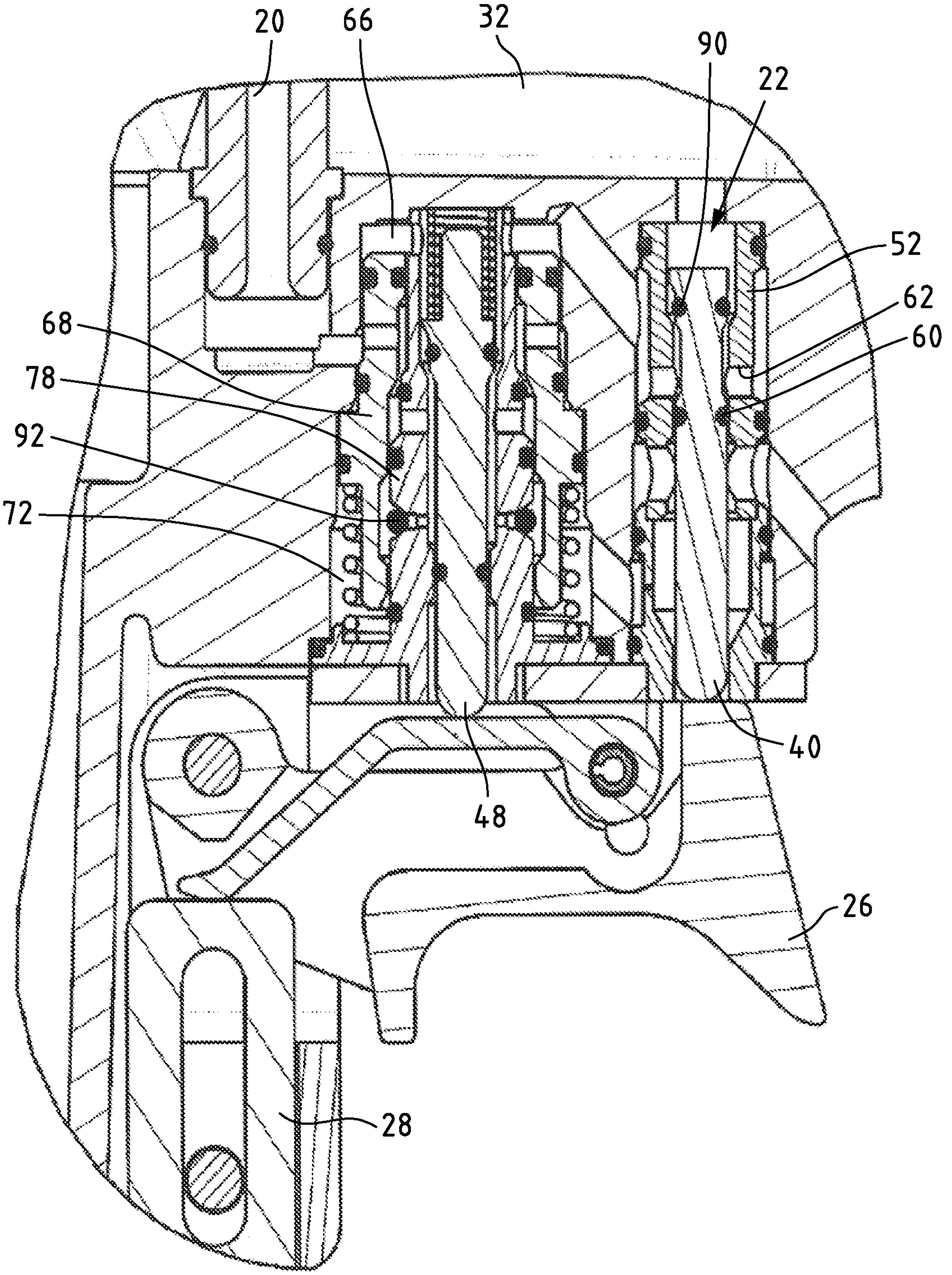

If, in the next step, the trigger 26 is also actuated, as shown in FIG. 4, the valve pin 40 of the first control valve 22 is moved into its actuated position and the lower O-ring 60 creates a seal and an upper O-ring 90 of the valve pin 40 releases the seal. As a result, there is a connection between the always aerated housing interior 32 and the space 66 via the transverse borehole 62 in the upper valve sleeve 52. This causes immediate aeration of the main control line 20 via the connection described above, so that a drive-in process is triggered. In addition, the control volume 72 is aerated via a non-return valve formed by a middle O-ring 92 on the valve sleeve 78. Immediately afterwards, the control volume 72 is therefore also under operating pressure, just like the space 66. The three forces acting on the locking sleeve 68 continue to act together such that the locking sleeve 68 remains in its upper end position.

Figure 5:
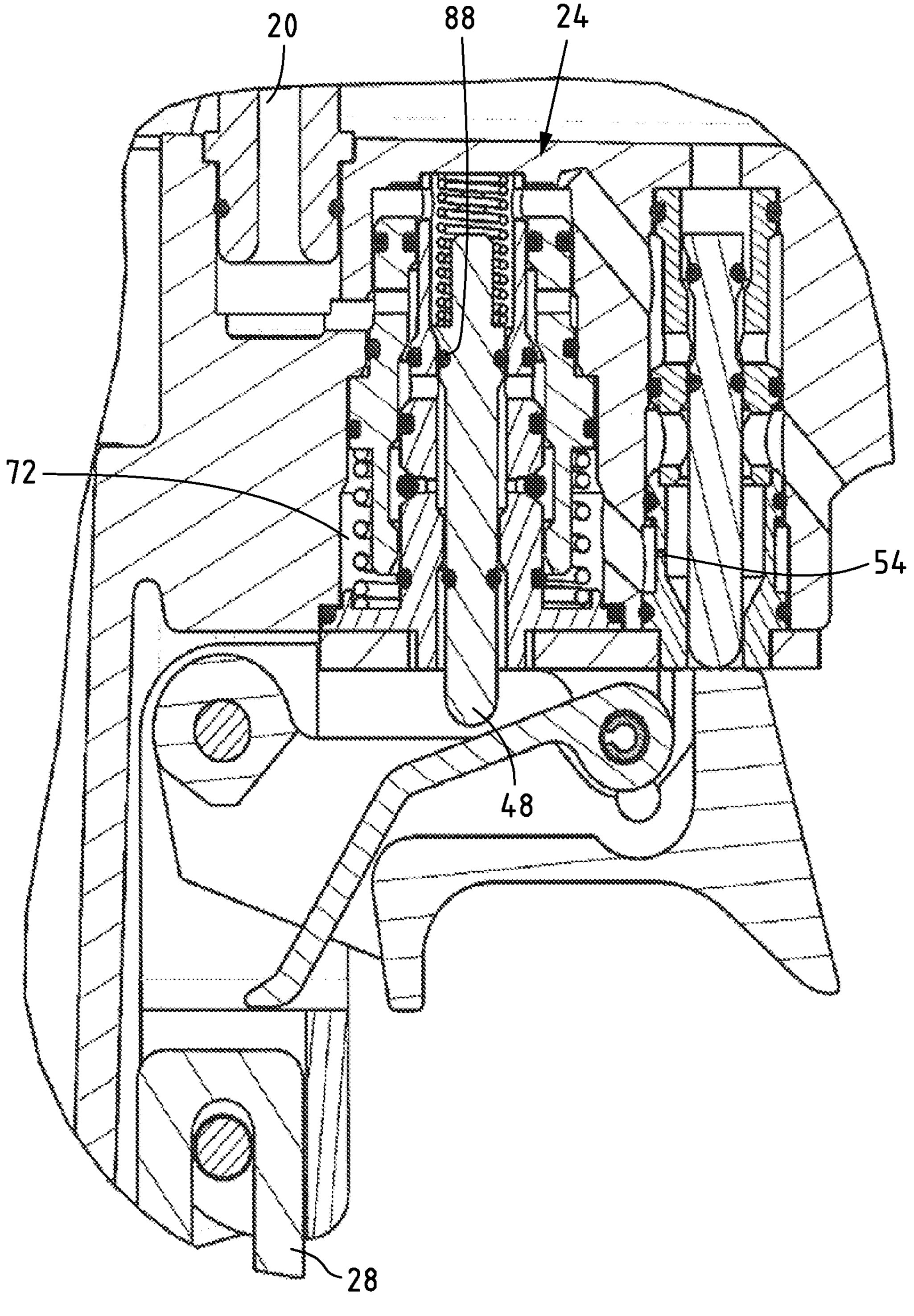

If the compressed air nail gun is then removed from the workpiece, the contact sensor 28 moves back downwards so that the valve pin 48 of the second control valve 24 also returns to its initial position, as shown in FIG. 5. As a result, the upper O-ring 88 of the valve pin 48 is sealed again so that no further compressed air supply to the main control line 20 or into the control volume 72 is possible. The pressure in the control volume 72 slowly decreases via the borehole 54. The main control line 20 is deaerated with external air via the connection already described in FIG. 2.

By re-actuating the contact sensor 28, starting from the state of FIG. 5, contact triggering can be carried out at any time because the main control line 20 can be aerated again by moving the valve pin 48 upwards. At the same time, the pressure in the control volume 72 is then refreshed via the non-return valve so that the delay time, within which further contact triggering is possible, starts running again.

However, if the contact sensor 28 remains unactuated for a certain time when the trigger 26 is actuated, the pressure in the control volume 72 falls below a specified pressure threshold. As a result, the balance of the three forces acting on the locking sleeve 68 changes and the locking sleeve 68 enters into its lower end position shown in FIG. 6. The lower end position is a locked position. In this position of the locking sleeve 68, a lower inner circumference of the locking sleeve 68 seals against the O-ring 94 so that a compressed air supply to the control volume 72 via the non-return valve is no longer possible. In addition, the upper O-ring 76 on the valve sleeve 78 creates a seal, so that a compressed air supply is also no longer possible via the transverse borehole 80 to the main control line 20.

Figure 6:
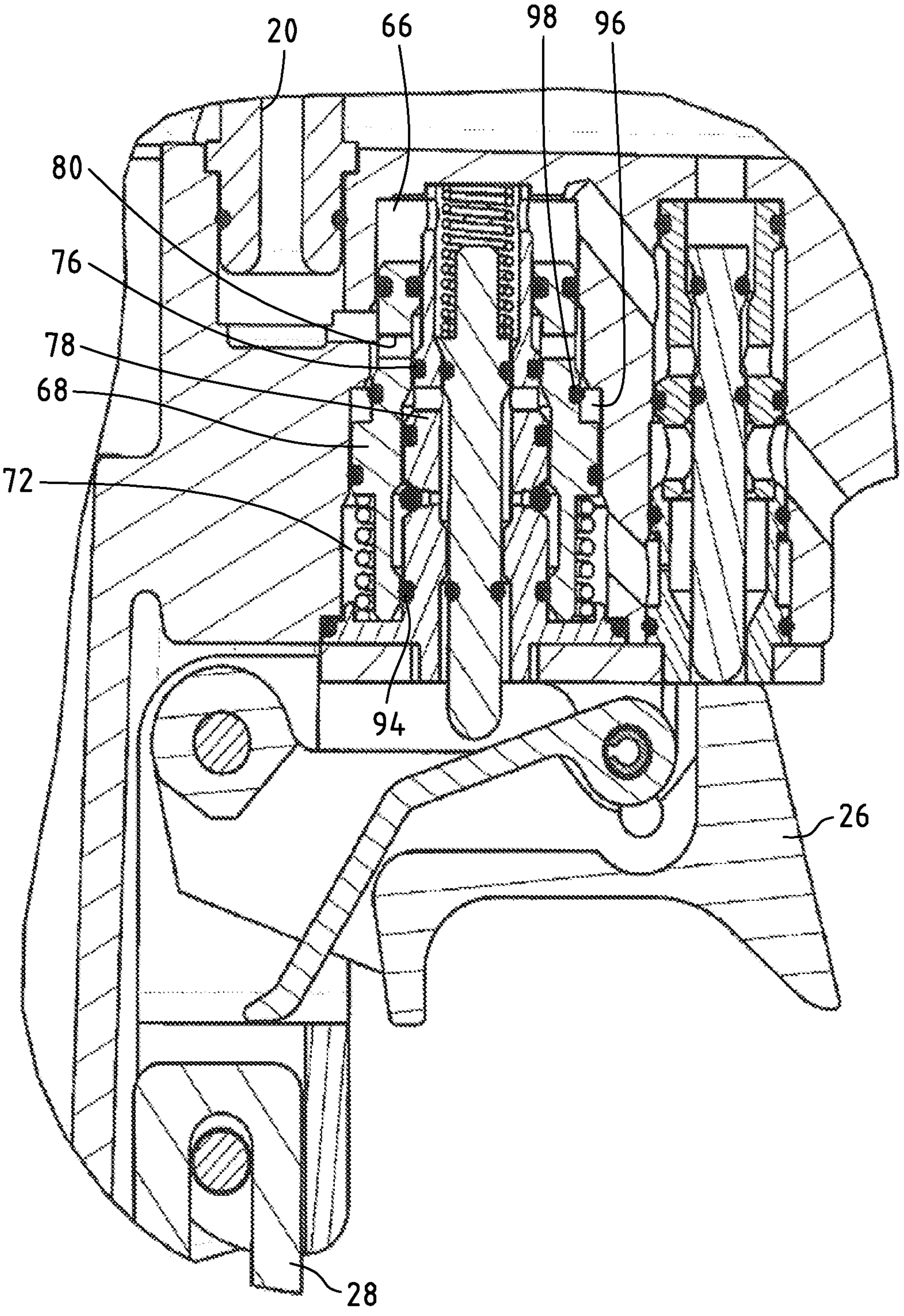
Figure 7:
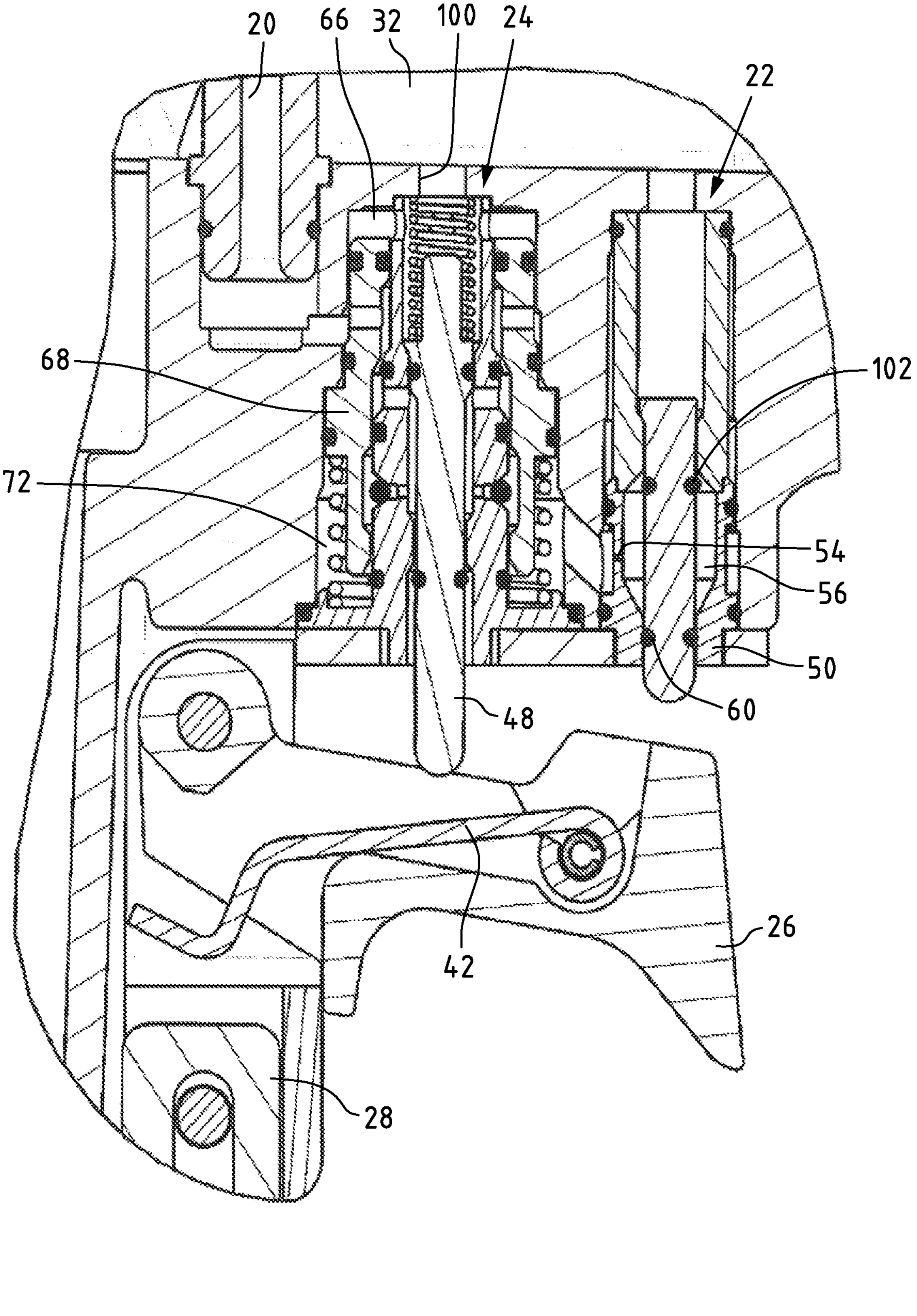

Furthermore, the space designated by 96 in FIG. 6 is connected to external air via a non-visible borehole. Since a middle O-ring 98 is not sealed on the locking sleeve 68, the main control line 20 is deaerated via the space 96. Moving the locking sleeve 68 into its locked position therefore represents a safety measure which reliably prevents the triggering of a further drive-in process. Further drive-in processes can only be triggered when the trigger 26 is released and thus the space 66 is deaerated so that the locking sleeve 68 moves back into its open position.

A second exemplary embodiment is explained with reference to FIGS. 7 to 10. With regard to the elements schematically represented in FIG. 1 and with regard to the design of the second control valve 24 with locking sleeve 68, there are no differences in relation to the first exemplary embodiment of FIGS. 1 to 6. The elements adopted unchanged may be provided with the same reference numerals as in the first exemplary embodiment and will not explained again.

There is a difference with the contact sensor lever 42, whose rear end is not fixed to the housing, but is hinged to a rear end of the trigger 26. As a result, the valve pin 48 of the second control valve 24 is not actuated with each actuation of the contact sensor 28, but only when trigger 26 and contact sensor 28 are actuated together. In addition, the space 66 above the locking sleeve 68 is not aerated via the first control valve 22, but is continuously connected to the housing interior 32 via a borehole 100.

The aforementioned changes with respect to the first exemplary embodiment allow a particularly simple configuration of the first control valve 22. This control valve comprises a lower valve sleeve 50 in which the borehole 54 is arranged, as explained in more detail in the first exemplary embodiment. In contrast to the first exemplary embodiment, the first control valve 22 exclusively fulfils the object of optionally aerating or deaerating the control volume 72 via the borehole 54. For this purpose, the first control valve 22, in its unactuated position indicated in FIG. 7 running past the upper O-ring 102, establishes a connection between the space 56 of the inside of the lower valve sleeve 50 and the housing interior 32, while the lower O-ring 60 is sealed. The control volume 72 is thus slowly aerated through the borehole 54. After a certain time has expired, after which the compressed air nail gun has been connected to a compressed air source and during which neither trigger 26 nor contact sensor 28 have been actuated, the compressed air nail gun is located in the initial state shown in FIG. 7. The control volume 72 is under operating pressure and the locking sleeve 68 is in its open position.

Figure 8:
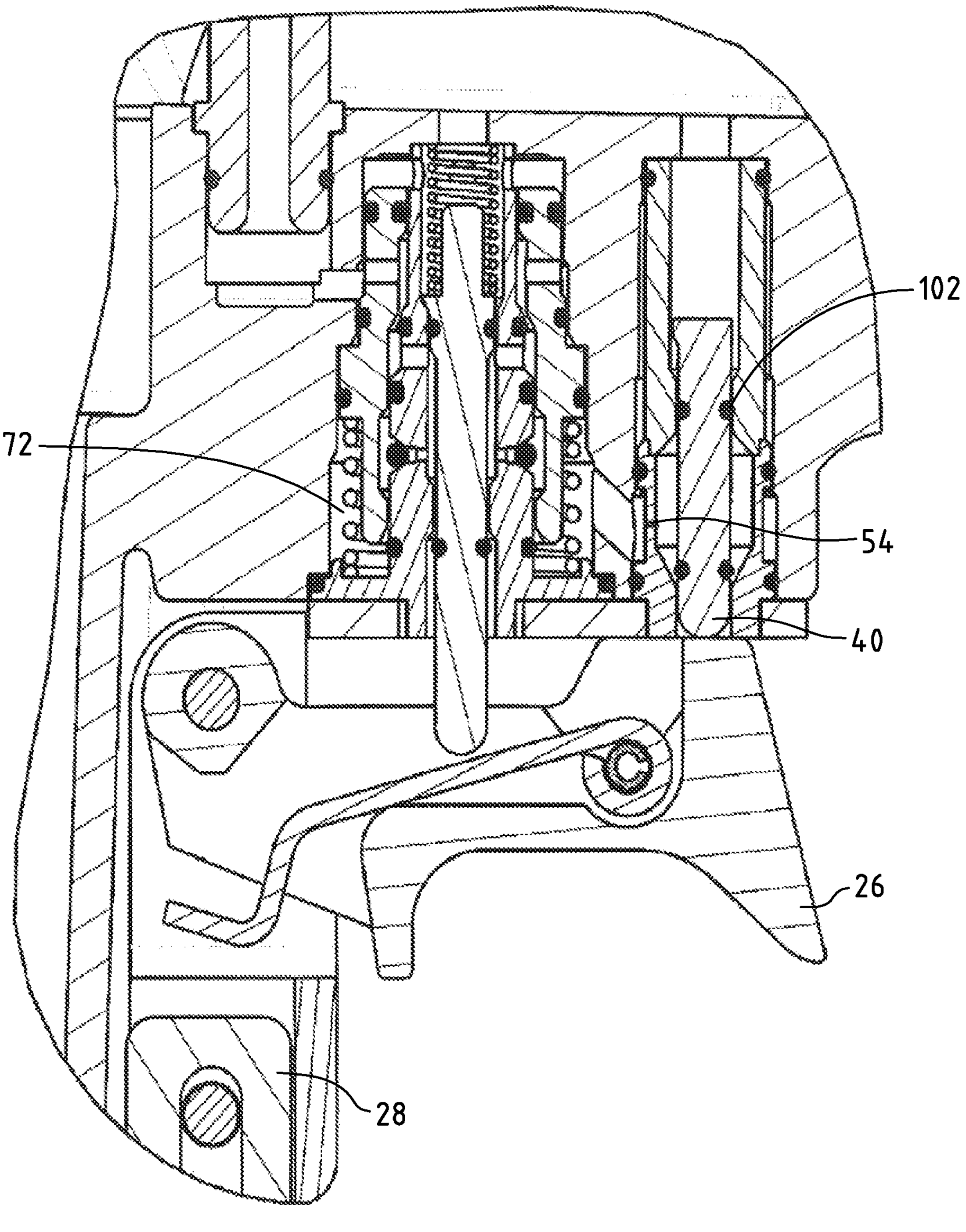

FIG. 8 shows the situation after the trigger 26 has been actuated. The upper O-ring 102 of the valve pin 40 is sealed and the control volume 72 is slowly deaerated via the borehole 54. Thus, the delay time starts to run when the trigger 26 is actuated.

Figure 9:
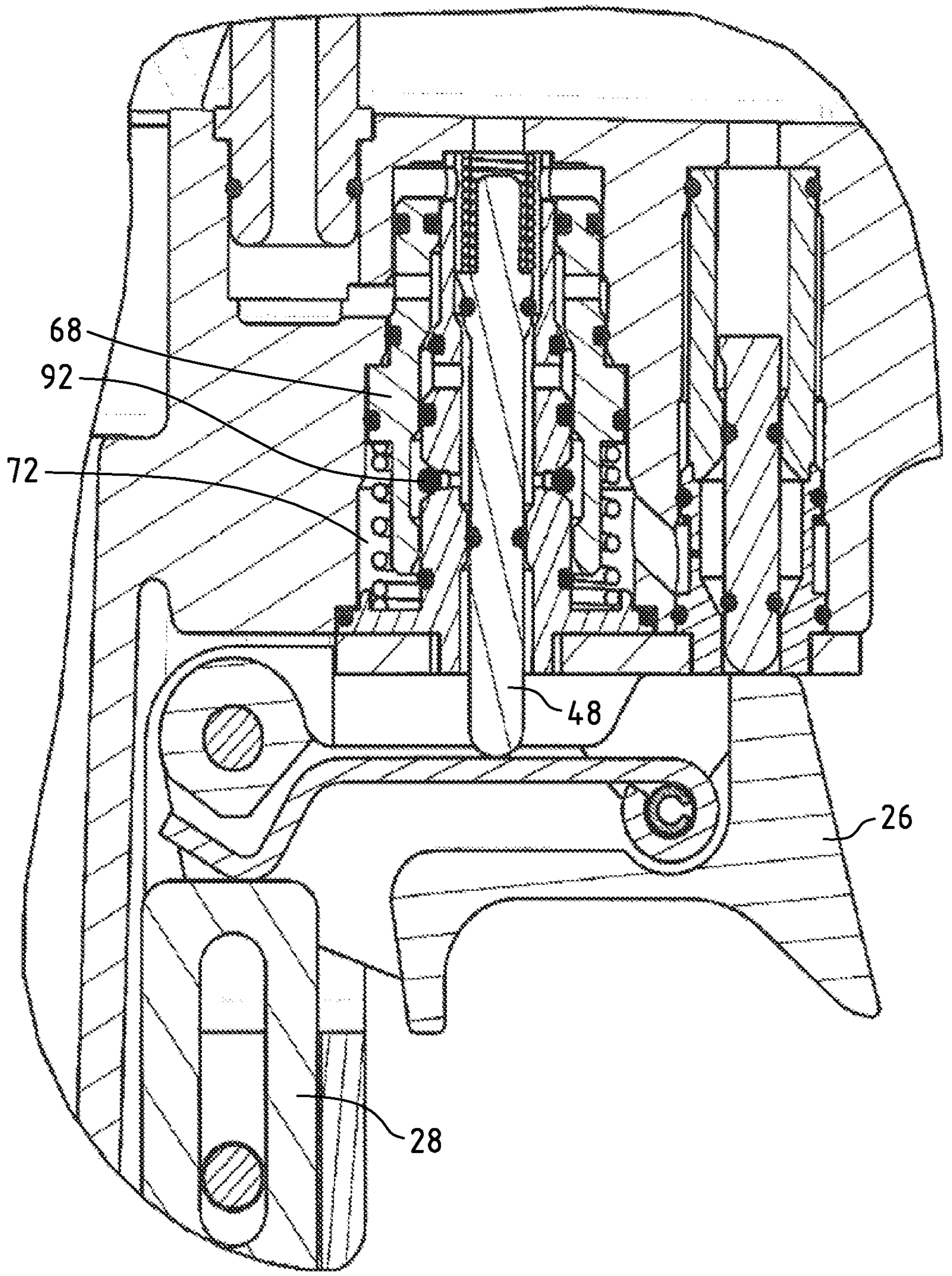

If the contact sensor 28 is actuated before expiry of the delay time with the trigger 26 still actuated, the valve pin 48 of the second control valve 24 is moved upwards, as represented in FIG. 9. This triggers a drive-in process in the same way as explained in the first exemplary embodiment. As explained in the first exemplary embodiment, the pressure in the control volume 72 is refreshed via the non-return valve formed by the middle O-ring 92.

After lifting the compressed air nail gun from a workpiece, the valve pin 48 of the second control valve 24 returns to its unactuated position and the control volume 72 is slowly deaerated via the borehole 54. Provided the pressure threshold in the control volume 72 is not undercut, the locking sleeve 68 remains in its open position so that the situation corresponds to that of FIG. 8. Further contact triggering is possible.

Figure 10:
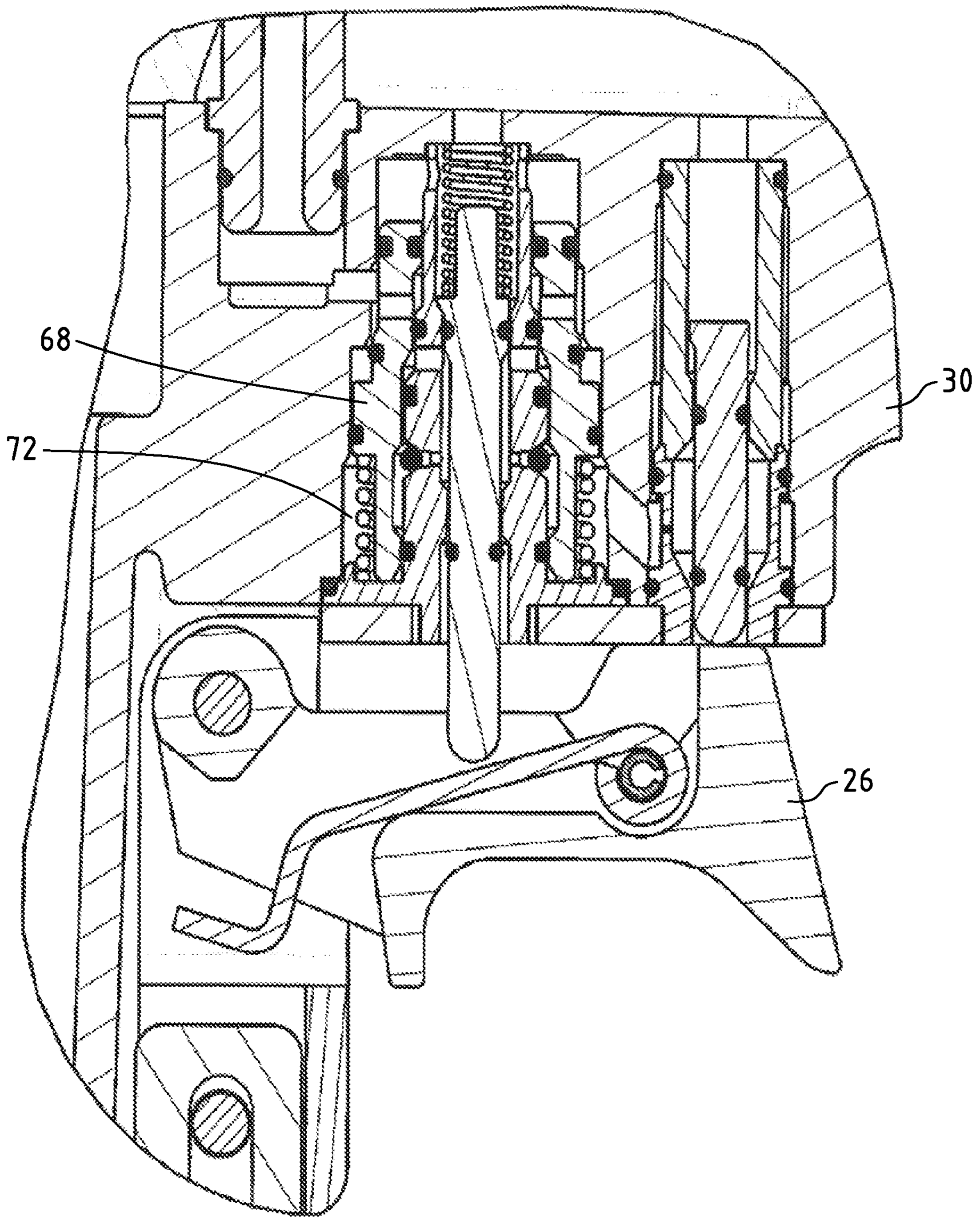

However, if the trigger 26 remains actuated without further triggering occurring within the delay time, the locking sleeve 68 is moved into its locked position shown in FIG. 10, which prevents further triggering in the same way as explained in the first exemplary embodiment. In order to enable further triggering, the trigger 26 must first be released again and it is necessary to wait until the pressure in the control volume 72 exceeds the pressure threshold and the locking sleeve 68 is moved back into its open position. Then, the device is again located in the state where it is ready to be triggered, shown in FIG. 8.

In both exemplary embodiments, the housing 30 has two recesses which receive the first control valve 22 and the second control valve 24. The control volume 72 is located within the recess, which receives the second control valve 24.

LIST OF REFERENCE NUMERALS

10 Working piston
12 Driving ram
14 Working cylinder
16 Main valve
18 Pilot Valve
20 Main control line
22 First control valve
24 Second control valve
26 Trigger
38 Contact sensor
30 Housing
32 Housing interior
34 Handle section
36 Axis
38 Actuating surface
40 Valve pin of the first control valve
42 Trigger lever
44 Axis
46 Actuating surface
48 Valve pin of the second control valve
50 Lower valve sleeve
52 Upper valve sleeve
54 Borehole
56 Space inside the lower valve sleeve
58 Annular gap
60 Lower O-ring
62 Transverse borehole
64 Borehole
66 Space
68 Locking sleeve
70 Spring
72 Control volume
74 Lower O-ring
76 Upper O-ring
78 Valve sleeve
80 Transverse borehole
82 Transverse borehole
84 Annular gap
86 Spring
88 Upper O-ring
90 Upper O-ring
92 Middle O-ring (non-return valve)
94 O-ring
96 Space
98 Middle O-ring
100 Borehole
102 Upper O-ring
104 Lower end
106 Transverse borehole
108 Borehole

The invention claimed is:

1. A compressed air nail gun, comprising:
a working piston which is connected to a driving ram for driving in a fastening means and to which compressed air is applied when a drive-in process is triggered;
a trigger and a contact sensor, a common actuation is configured to trigger a drive-in process; and
a safety device which has a control volume and is designed to automatically take a safety measure when a pressure threshold is exceeded or undercut in the control volume, wherein the control volume is aerated or deaerated via a throttle in such a way that a delay time, after the expiry of which the pressure threshold is exceeded or undercut, is specified by a volume of the control volume and an opening cross-section of the throttle, wherein
the control volume has a volume in the range of 0.5 ml to 20 ml and the throttle is a borehole with a diameter in the range of 30 μm to 95 μm, the borehole arranged in a replaceable component of the compressed air nail gun, the replaceable component being a valve sleeve.

2. The compressed air nail gun according to claim 1, wherein the borehole is produced by laser drilling.

3. The compressed air nail gun according to claim 1, wherein the borehole has a length in the range of 30 μm to 1 mm.

4. The compressed air nail gun according to claim 1, wherein the compressed air nail gun has a first control valve, which is actuated with each actuation of the trigger, wherein the control volume is aerated or deaerated via the first control valve.

5. The compressed air nail gun according to claim 1, wherein the compressed air nail gun has a second control valve, which is actuated with each actuation of the contact sensor or with each common actuation of trigger and contact sensor, wherein a main control line is aerated and/or deaerated via the second control valve.

6. The compressed air nail gun according to claim 1, wherein the control volume comprises an annular volume which surrounds a control valve.

7. The compressed air nail gun according to claim 1, wherein the compressed air nail gun comprises a housing which has a recess in which a control valve arrangement is arranged, wherein the control volume is arranged in full or in large part in the recess.

8. The compressed air nail gun according to claim 1, wherein the safety measure is that the compressed air nail gun is moved to a locked state in which no drive-in process can be triggered.

9. The compressed air nail gun according to claim 1, wherein the compressed air nail gun is configured to operate in a contact triggering operation and in a single triggering operation and the safety measure is that the compressed air nail gun is moved from the contact triggering operation to the single triggering operation.

10. The compressed air nail gun according to claim 1, wherein the compressed air nail gun has a locking sleeve, which is movable between a locked position and an open position, wherein the locking sleeve shuts off a connection between a main control line and a control valve in the locked position and opens it in the open position.

11. The compressed air nail gun according to claim 10, wherein a pressure in the control volume is applied to the locking sleeve.

12. A compressed air nail gun, comprising:

a working piston which is connected to a driving ram for driving in a fastening means and to which compressed air is applied when a drive-in process is triggered;

a trigger and a contact sensor, a common actuation is configured to trigger a drive-in process; and a safety device which has a control volume and is designed to automatically take a safety measure when a pressure threshold is exceeded or undercut in the control volume, wherein the control volume is aerated or deaerated via a throttle in such a way that a delay time, after the expiry of which the pressure threshold is exceeded or undercut, is specified by a volume of the control volume and an opening cross-section of the throttle, wherein the control volume has a volume in the range of 0.5 ml to 20 ml and the throttle is a borehole with a diameter in the range of 30 μm to 95 μm and the compressed air nail gun has a locking sleeve, which is movable between a locked position and an open position, wherein the locking sleeve shuts off a connection between a main control line and a control valve in the locked position and opens it in the open position.

* * * * *